United States Patent [19]
Goto

[11] 4,024,660
[45] May 24, 1977

[54] ADVERTISING POCKET FOR SHOPPING CARTS

[76] Inventor: Irving A. Goto, 6220 W. Newport, Chicago, Ill. 60634

[22] Filed: Apr. 5, 1976

[21] Appl. No.: 673,796

[52] U.S. Cl. ............................... 40/308; 40/10 D; 40/159
[51] Int. Cl.² .......................................... G09F 1/10
[58] Field of Search ........... 40/159, 124.2, 104.18, 40/104.19, 10 D, 10 R, 308, 21 R, 158, 10 B, 10 C, 129 R, 129 A, 129 B, 129 C; 280/33.99 A, 33.99 B

[56] References Cited

UNITED STATES PATENTS

| | | | |
|---|---|---|---|
| 2,027,517 | 1/1936 | Cobbs | 40/10 B |
| 2,181,324 | 11/1939 | Glover | 40/10 R |
| 2,198,718 | 4/1940 | Cobbs | 40/10 B |
| 2,384,274 | 9/1945 | Bean | 40/10 R |
| 3,214,852 | 11/1965 | Ford et al. | 40/129 A |
| 3,218,748 | 11/1965 | Hopp | 40/308 |
| 3,287,841 | 11/1966 | Spragg et al. | 40/308 |
| 3,782,747 | 1/1974 | Hamilton | 40/308 |
| 3,816,948 | 6/1974 | Mooney et al. | 40/159 |
| 3,943,645 | 3/1976 | Viesturs | 40/159 X |

*Primary Examiner*—John F. Pitrelli
*Attorney, Agent, or Firm*—McWilliams & Mann

[57] ABSTRACT

A weather-proof and inexpensive advertising pocket for attachment to a shopping cart in a manner permitting direct viewing by a user of the cart of printed matter insertable into the pocket. A continuous back is of generally rectangular configuration. A transparent window of approximately the same horizontal width as the back, but of less vertical height, is aligned in parallel planar relationship with the back such that the window spans most of the area of the back except along one horizontal edge of the back. A lip is of approximately the same horizontal width as the back and is of sufficient vertical height to span the area of the back not spanned by the window and to overlap a small portion of the window in a manner preventing precipitation from entering the pocket. An internal pocket area is provided by sealing the back, window and lip about the edges of the back. The window and lip are fabricated from flexible sheet material such that an edge of the lip overlapping an edge of the window are separable from each other for inserting or removing printed matter from the internal pocket area. Attachment means for securing the pocket about a portion of the mesh work of the cart includes a pair of straps fastened at one end thereof along an edge of the back, a first pair of snap-type fasteners secured to the back along an opposite edge, and a second pair of snap-type fasteners secured to the other ends of the straps, with the second pair of fasteners adapted for cooperation with the first pair of fasteners such that the straps are in a generally parallel spaced-apart relationship, with a portion of the mesh work of the cart securing and supporting the pocket between the back and the straps of the pocket.

4 Claims, 6 Drawing Figures

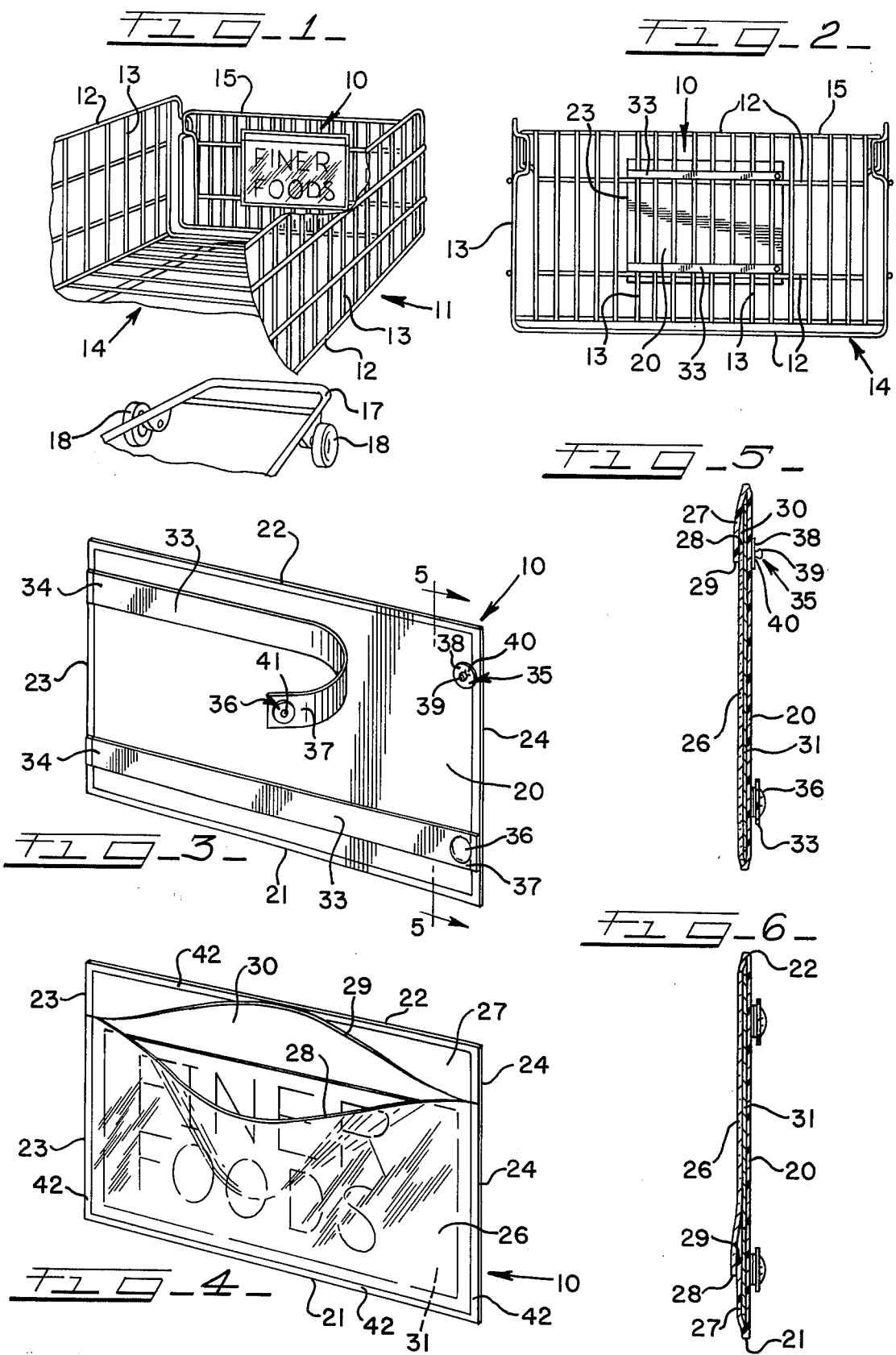

ADVERTISING POCKET FOR SHOPPING CARTS

BACKGROUND OF THE INVENTION

This invention relates in general to advertising displays for shopping carts, and more particularly to an advertising pocket which is of inexpensive and weather-proof construction including a back of generally rectangular configuration, a transparent window spanning most of the area of the back except along a horizontal edge thereof and a lip spanning the area of the back not spanned by the window with a portion of the lip in overlapping relationship with the window.

Various types of advertising display holders are known in the prior art. Most of such holders do not prevent precipitation and the like from entering the area in which the advertising sheet is inserted. Advertising matter inserted into the display holders is preferably a sheet or card of paper for reasons of ease of printing and economy. However, paper has a tendency to wrinkle or curl when subjected to precipitation such that the advertising matter becomes unsightly and must be replaced. In some instances, any accumulation of moisture in the holder must also be removed before a new sheet of advertising matter is inserted therein.

Prior art display holders have also been characterized by quite expensive construction. Because most businesses of the type which utilize shopping carts have considerable numbers of shopping carts, prior art dislay holders have not enjoyed a great deal of commercial success because of the prohibitive expense involved in equipping all of the shopping carts with display holders. Another reason for the quite expensive construction is that the holders have been designed to withstand damage thereto caused by having shopping carts banged together or because of vandalism. Even so, prior art holders are still subject to damage. When the holder becomes unsightly enough to warrant replacement, the expensive nature of the holder is faced again.

Furthermore, some prior art display holders are in the nature of a frame which supports advertising matter inserted therein, requiring the advertising matter itself to withstand the abuses common to shopping cart use. These frames also require that the advertising matter inserted therein be of uniform size since only the edges of the advertising matter are supported.

SUMMARY OF THE INVENTION

Contrary to the prior art in which display holders were made as rugged and durable as possible to withstand the abuses common to shopping carts, the advertising pocket of the present invention is of such inexpensive construction that the pocket may be replaced at very modest cost when the pocket becomes damaged or otherwise unsightly in appearance. A continuous back is preferably of rectangular configuration. A transparent window of approximately the same horizontal width as the back, but of less vertical height than the back, is aligned in parallel planar relationship with the back such that the window spans most of the area of the back except along one horizontal edge of the back. A lip, of approximately the same horizontal width as the back, is of sufficient vertical height to span the area of the back not spanned by the window and to overlap a small portion of the window. The window, back and lip are all preferably fabricated from inexpensive sheet material. Although the window requires transparent stock, the back and lip may be opague and color-coded with the colors associated with the trademarks or decor employed by the business.

Another novel feature of the present invention is that the lip, window and back are heat-sealed about all the edges of the back, thereby defining an interior pocket area into which printed matter in the nature of advertisements and the like may be inserted or removed. Because plastic sheet stock is preferably used in the construction of the pocket, the edge of the lip in overlapping relationship with an edge of the window are both quite flexible and are easily separated to gain access to the interior pocket area. Because the back, window and lip fully enclose the printed matter inserted into the interior pocket area, the printed matter may be of virtually any size which does not exceed the height or width of the pocket and still be supported by the pocket.

The lip and the window are in an overlapping relationship such that precipitation and the like cannot enter the interior pocket area while the pocket is in use. Thus the pocket and the shopping cart to which it is attached may be left outside in parking lots and the like without fear of subjecting the printed matter in the pocket from exposure to precipitation.

Various means for attaching the pocket to the shopping cart may be employed. A preferred means includes a pair of straps attached along an edge of the back, a first pair of fasteners secured to an opposite edge of the back and a second pair of fasteners secured to the other ends of the straps, with the second pair of fasteners adapted for snapping and cooperating engagement with the first pair of fasteners. The pocket is attached to the shopping cart by containing a portion of the meshwork thereof between the back and the straps of the pocket.

Various other objects, features and advantages of the invention will become apparent from the following detailed disclosure when taken in conjunction with the drawings.

BRIEF DESCRIPTION OF THE DRAWINGS

In the drawings:

FIG. 1 is a fragmentary perspective view of the front portion of a shopping cart illustrating the front side of the advertising pocket with printed matter inserted therein and further illustrating a typical placement of the advertising pocket on the shopping cart;

FIG. 2 is an elevational view of the front of the basket of a shopping cart illustrating the attachment of the advertising pocket about a portion of the meshwork of the basket;

FIG. 3 is a perspective view of the back side of the advertising pocket illustrating a pair of straps secured to one edge of the back and snap-type connectors used for securing the other ends of the straps to an opposite edge of the back;

FIG. 4 is a perspective view of the front of the advertising pocket illustrating how the edge of the lip which is in overlapping relationship with an edge of the window may be flexible separated to gain access to the interior pocket area for insertion or removal of printed matter;

FIG. 5 is a cross-sectional view of the pocket in FIG. 3 taken along the sectional line 5—5 in FIG. 3 further illustrating the construction of the pocket and the overlapping relationship of the lip and window; and FIG. 6 is a cross-sectional view illustrating an alternate overlapping relationship between the window and the lip.

DESCRIPTION OF THE PREFERRED EMBODIMENTS

The advertising pocket, generally designated 10, is typically attached to a shopping cart, generally designated 11, in the inside, front of the shopping cart 11 for direct viewing by a user of the shopping cart, as illustrated in FIG. 1. Typical shopping carts 11 have a plurality of vertically disposed rods 12 in a parallel spaced apart relationship and a plurality of horizontally disposed rods 13 also in a parallel, spaced apart relationship to define a meshwork of a basket 14 of the shopping cart 11. Some carts 11 employ an elevated basket 14 with a front flap 15 which may be opened and the flap 15 laid parallel with a check-out counter (not shown) such that any items in the shopping cart may be slid out of the basket 14 unto the check-out counter. Other types of shopping carts 11 include the deeper basket style wherein the flap 15 is an integral part of the cart 11. The advertising pocket 10 of the present invention is suitable for use with either the elevated basket style or the deep basket style of shopping cart 11.

Various other structural features of shopping carts 11, such as a lower frame 17 for supporting the basket 14 and wheels 18 connected to the frame 17, are not of concern in understanding or appreciating the invention.

According to the invention, the pocket 10 has a continuous back 20. The back 20 is preferably rectangular in configuration with a bottom horizontal edge 21, a top horizontal edge 22 opposite the edge 21, a vertical edge 23 and an opposite vertical edge 24. The horizontal edges 21, 22 define a vertical height therebetween and the vertical edges 23, 24 define a horizontal width therebetween. A transparent window 26 as illustrated in FIGS. 1 and 4 has a horizontal width of approximately the same as that of the back 20. The window 26 however has a vertical height of somewhat less than that of the back 20. The window 26 is aligned in parallel planar relationship with the back 20 such that the window 26 spans most of the area of the back 20, except for an area in the vicinity of and along one of the horizontal edges 21, 22. That is, the window 26 has vertical edges 23, 24 common with those of the back 20 and has one horizontal edge 21 common with that of the back 20. However, the window 26 is not of sufficient vertical height to extend to the opposite horizontal edge 22 of the back 20 to share another common edge therewith. A lip 27 is of approximately the same horizontal width as the back 20 such that the lip 27 shares vertical edges 23, 24 common with the edges 23, 24 of the back 20 along a portion thereof.

The lip 27 is of sufficient vertical height to span the area of the back not spanned by the window 26 and to overlap a small portion of the vertical height of the window 26. That is, the lip 27 shares a common horizontal edge 22 with the back 20 and the window 26 and the lip 27 have overlapping edges 28, 29, respectively. The edges 21, 22, 23, 24 of the back 20, the window 26 and the lip 27 are sealed about their lengths to provide an interior pocket area 30. Access to the interior pocket area 30 is gained by flexibly separating the overlapping edge 28 of the window 26 from the overlapping edge 29 of the lip 27 as illustrated in FIG. 4.

When the overlapping edges 28, 29 are flexibly separated, advertising matter 31 may be inserted or removed from the interior pocket area 30 of the advertising pocket 10.

Various forms of attachment means for the pocket 10 may be employed to secure the pocket 10 about the meshwork of the basket 14, preferably to the front panel 15 of the basket 14 in a manner which permits direct viewing by the user of the shopping cart 11. The desired manner of positioned the pocket 10 with respect to the cart 11 is illustrated in FIGS. 1 and 2. In FIG. 1, the pocket 10 is located inside of the basket 14 on the front vertical panel of flap 15 thereof. FIG. 2 is a front elevational view of the shopping cart 11 illustrating the back side of the pocket 10 and the attachment of the pocket 19 to the flap 15. The attachment means for the pocket 10 preferably includes a pair of straps 33 with the straps 33 secured to the back 20 along an edge, for example edge 23 of the pocket 10 near one end 34 of the straps 33. As will be described hereinafter, the straps 33 are typically attached to the back 20 along one horizontal edge 23. Disposed along an opposite horizontal edge 24 of the back 20 and secured to the back 20 are a first pair of fasteners 35. Secured to another end 37 of the straps 33 are a second pair of fasteners 36. The fasteners 35, 36 are preferably of snap-type, a variety of which are known to those skilled in the art. For example, the fasteners 35, 36 may be of the common, cooperating male-female type.

The fastener 35 as illustrated in FIGS. 3 and 5 is of the male type and has a base portion 38 rigidly secured to the back 20 in a location near the vertical edge 24. The fastener 35 furher has an enlarged head portion 39 connected to the base portion 38 by a narrow neck 40. The second fastener 36 is of the female-type and has an annular opening 41, with the opening 41 being slightly less in diameter than the head 39 of the first fastener 35. When the second fastener 36 is applied under pressure against the first fastener 35, the annular opening 41 of the second connector will snap over the head portion 39 of the first connector 35 and engage the reduced neck portion 40 of the first fastener. When the fasteners 35, 38 are snapped together, the straps 33 will support and attach the pocket 10 about some of the horizontally and vertically disposed rods 12, 13 of the basket 14 as illustrated in FIG. 2. The pocket 10 is supported in the horizontal direction by the strap 33 wrapping around some of the vertically disposed rods 13. The pocket 10 is supported in the vertical direction by at least one of the straps 33 coming to rest against one of horizontally disposed rods 12. The fasteners 35, 36 and the straps 33 may alternately be attached along the horizontal edges 21, 22 of the pocket 10 where the type of meshwork on the cart 11 makes a vertical orientation of the straps 33 preferable.

Turning now to the construction and fabrication of the advertising pocket, plastic sheet materials, such a vinyl, are preferred. Plastic sheet materials enable the pocket 10 to be inexpensive and also provide a moisture impervious enclosure for the advertising matter 31. The window 26 is fabricated from transparent sheet stock. By "transparent" is meant both sheet stock which exhibits transparent qualities as well as those sheet stocks which, while though translucent, provide sufficient transparency when printed matter is in proximate relation thereto. That is, some materials which would be classified as translucent have transparent qualities if the object being viewed is sufficiently close to the material.

The lip 27, the back 20 and the straps 33 are also preferably fabricated from plastic sheet stock, such as vinyl, but may be fabricated from opaque materials because transparency is not essential. The lip 27, the back 20 and the straps 33 may thus be of color-coded plastic sheet stock to correspond with the colors commonly associated with the particular business such as their trademarks, decor and the like. Use of plastic sheet stock also enables the pocket 10 to be heat sealed about the edges 21, 22, 23, 24 of the back 20 thereby further assuring that the interior pocket area 30 is kept free of precipitation. The straps 33 may also be secured to the back 20 at one end 34 of the straps 33 during the heat sealing process. The heat sealing process will be along a narrow width 42 about the edges 21, 22, 23, 24, both on the front and back side of the pocket 10.

Plastic sheet materials are further desirable because of their resistance to damage which results from the flexible nature thereof. However, it is likely that sooner or later the pocket 10 will be sufficiently damaged or unsightly marred that replacement may become necessary. Shopping carts 11 are often banged together and receive other rough treatment, including vandalism. Because of the inexpensive construction of the advertising pocket 10, the pocket 10 may be replaced with minimal economic loss. The flexible nature of plastic materials also enables the overlapping edges 28, 29 of the window 26 and the lip 27 respectively, to be easily separated to gain access to the interior pocket area 30.

The advertising pocket 10 is capable of receiving many types of printed matter 31. Of course, printed matter 31 must be of smaller vertical and horizontal dimensions than the pocket 10. The printed matter 31 may be in either sheet or card form and may take the form of various types of paper. Paper is especially preferred in advertising displays because it is easily printed and it is quite economical compared to other types of materials.

An important feature of the advertising pocket 10 is that the lip 27 and the window 26 are in overlapping relationship such that precipitation is prevented from being admitted into the interior pocket area 30 and thereby resulting in the printed matter 31, if paper, becoming wrinkled and curled in an unsightly manner. In the preferred embodiment, illustrated in cross-sectional form in FIG. 5, the lip 27 overlaps the window 26 such that any precipitation on the surface of the lip 27 will roll of the lip 27 onto the window 26 without being admitted into the interior pocket area 30. The overlapping embodiment illustrated in FIG. 5 is further preferred because the relatively short vertical dimension of height of the lip 27 renders support in keeping the window 26 against the printed matter 31. That is, the window 26 may have a tendency to bulge away from the printed matter 31.

However, an alternative embodiment illustrated in FIG. 6 may also be employed where the lip 27 is disposed along the lower horizontal edge 21 and the window 26 spans the upper portion of the pocket 10 rather than the lower portion. In this embodiment, the window 28 will overlap the lip 27.

For illustrative purposes only, a typical pocket could have a horizontal width of 22½ cm. and a vertical height of 16 cm. The vertical height of the lip 27 could be about 3 cm. and the vertical height of the window 22 could be about 13½ cm., with the lip 27 overlapping the window 26 by approximately 4 mm. The lip 27, the back 20 and the straps 33 could all be fabricated from 13 gauge vinyl plastic sheet stock. For ornamental purposes, the sheet stock could have a leather-grained texture. The window 26 could be fabricated from 8 gauge vinyl plastic sheet stock which is either transparent of suitably translucent as previously described. Preferably the vertical height of the lip 27 is at least three times the vertical height of the window 26 such that the overlapping edges 28, 29 of the window 26 and the lip 27 are not remote from one of the horizontal edges 21, 22 of the pocket 10. This relationship of vertical heights of the lip 27 and the window 26 permits the printed matter 31 to be inserted into the interior pocket area 30 without excessive creasing or folding of the printed matter 31, as would be required if the lip 27 and the window 26 spanned approximately equal areas with respect to the back 20, which would result in the overlapping edges 28, 29 being near the center of the pocket 10 and the back 20.

It will be understood various changes and modifications may be made with departing from the spirit of the invention as defined in the following claims, and equivalents thereof.

I claim:

1. An advertising pocket for attachment to a shopping cart of the type having horizontally and vertically disposed rods defining a meshwork therefor, said pocket adapted for attachment about a portion of said meshwork in a manner permitting direct viewing by a user of a shopping cart of printed matter insertable into said pocket, said pocket comprising a continuous back of generally rectangular configuration with a horizontal width, a vertical height; and horizontal and vertical edges associated therewith;

a transparent window of approximately the same horizontal width as said back, but of less vertical height then said back, said window aligned in parallel planar relationship with said back such that said window spans most of the area of said back except along one horizontal edge thereof;

a lip of approximately the same horizontal width as said back and of sufficient vertical height to span the area of said back not spanned by said window and to overlap a small portion of said window;

said back, window and lip being sealed around the edges of the back thereby defining an interior pocket area between said back and said window and said lip, said window and said lip being of said flexible sheet material such that an edge of the lip overlapping an edge of said window are separable from each other for inserting printed matter in said pocket area or removing the same therefrom;

said lip overlapping said window thereby further preventing precipitation from entering said interior pocket area; and attachment means affixed to the back of said pocket adapted to secure said pocket to the meshwork of said shopping cart; said attachment means being of a type which keeps said pocket in a generally planar orientation when attached to said shopping cart, said attachment means comprises a pair of straps fabricated from plastic sheet stock and fastened at one end thereof at spaced positions along an edge of said back; a pair of first fasteners secured to said back along an opposite edge; and a pair of second fasteners attached to other ends of said straps, said pair of second fasteners adapted for snapping and cooperating engagement with said pair of first fasteners, said pair of first fasteners positioned along said opposite edge such that said pairs of straps are disposed along said back in a parallel spacedapart relationship when said first fasteners and said second fasteners are engaged.

2. The pocket as in claim 1 wherein said lip overlaps said windows by approximately 4 mm.

3. The pocket as in claim 1 wherein the plastic sheet material for said back and for said lip is approximately 13 gauge vinyl plastic sheet stock and the plastic sheet material for said transparent window is approximately 8 gauge vinyl sheet stock.

4. The pocket as in claim 3 wherein said plastic sheet material for said back and for said lip is opaque.

* * * * *